April 28, 1970
M. A. HANKINS
3,508,481
STUDIO LAMP WITH BUILT-IN CAMERA
Filed Sept. 1, 1967
6 Sheets-Sheet 1
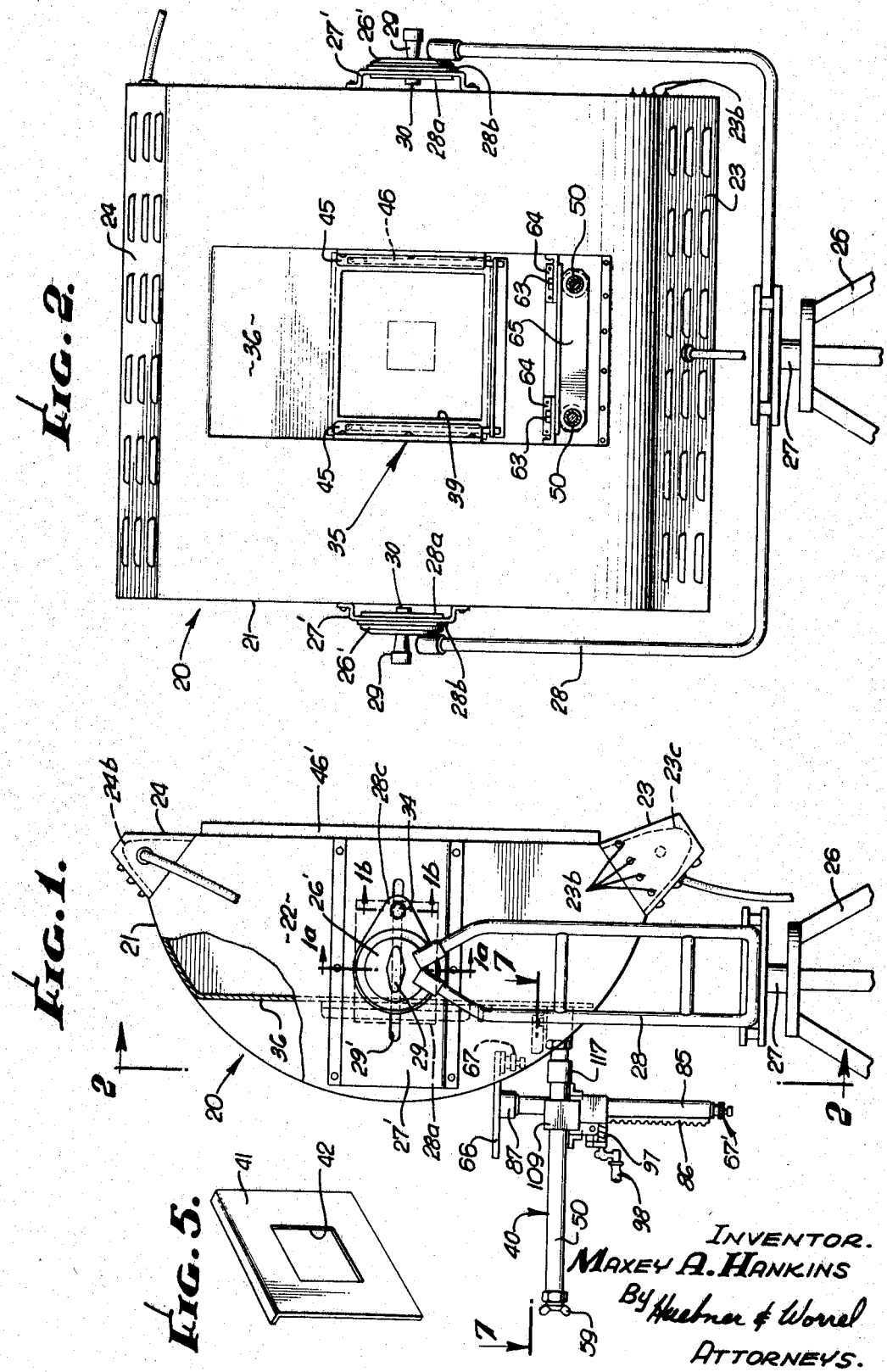
INVENTOR.
MAXEY A. HANKINS
By Huebner & Worrel
ATTORNEYS.

April 28, 1970     M. A. HANKINS     3,508,481
STUDIO LAMP WITH BUILT-IN CAMERA
Filed Sept. 1, 1967     6 Sheets-Sheet 2
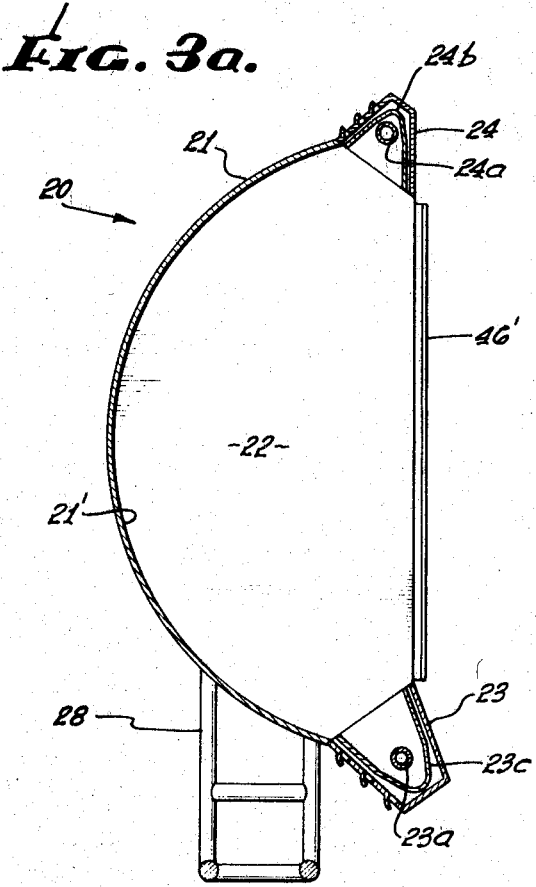
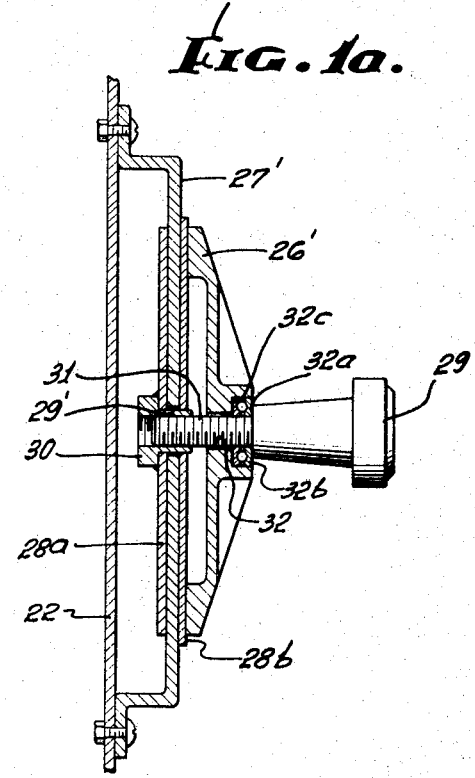
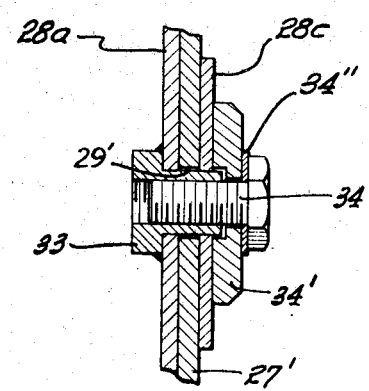
INVENTOR.
MAXEY A. HANKINS
By Huebner & Worrel
ATTORNEYS.

April 28, 1970 M. A. HANKINS 3,508,481
STUDIO LAMP WITH BUILT-IN CAMERA
Filed Sept. 1, 1967 6 Sheets-Sheet 3
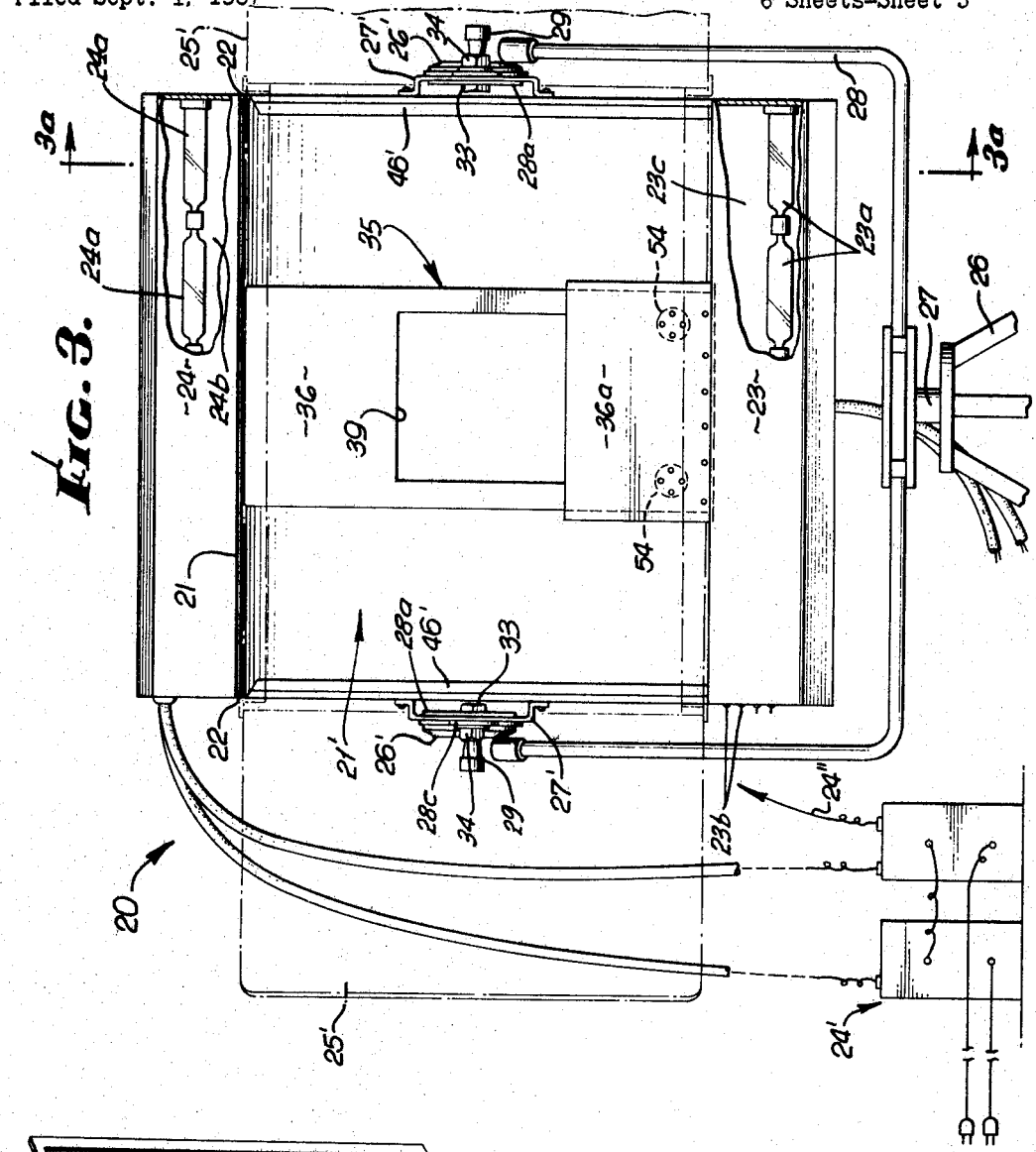
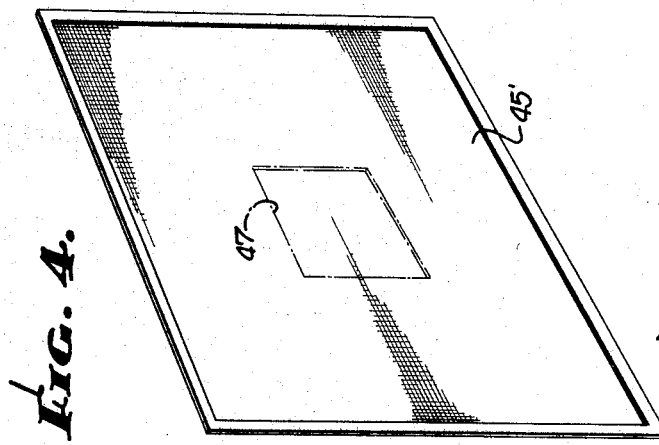
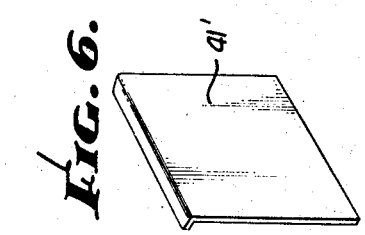
INVENTOR.
MAXEY A. HANKINS
By Huebner & Worrel
ATTORNEYS.

April 28, 1970 M. A. HANKINS 3,508,481
STUDIO LAMP WITH BUILT-IN CAMERA

Filed Sept. 1, 1967 6 Sheets-Sheet 4

INVENTOR.
MAXEY A. HANKINS
By Huebner & Worrel
ATTORNEYS.

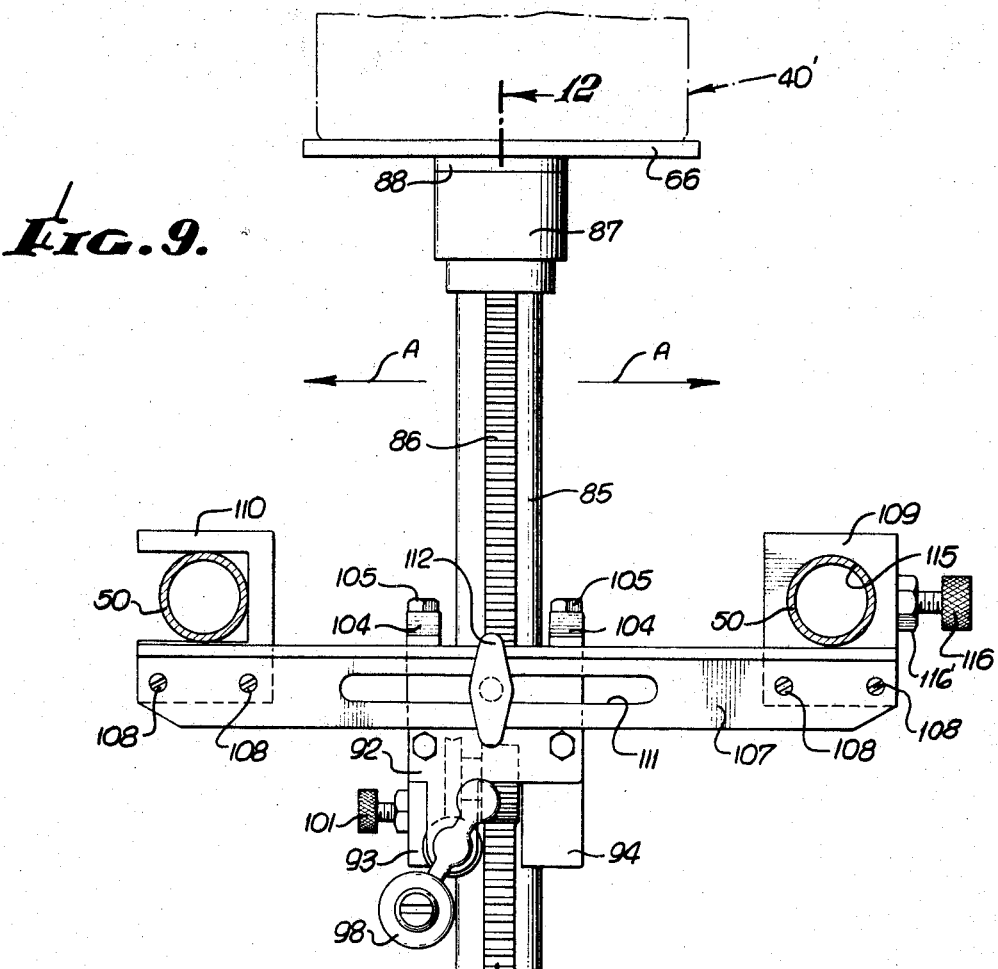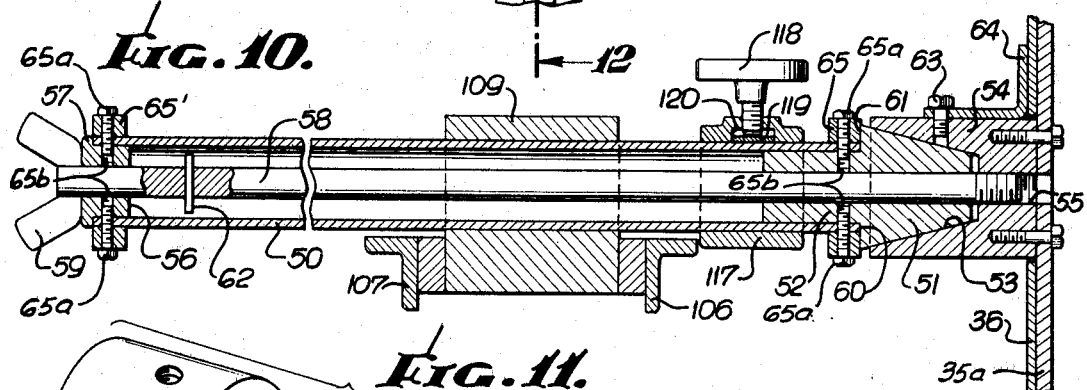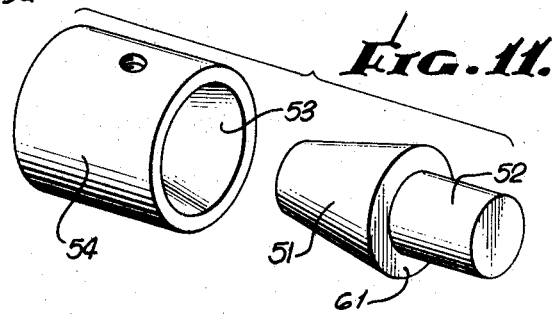

April 28, 1970  M. A. HANKINS  3,508,481
STUDIO LAMP WITH BUILT-IN CAMERA
Filed Sept. 1, 1967  6 Sheets-Sheet 6

INVENTOR.
MAXEY A. HANKINS
By Huebner & Worrel
ATTORNEYS.

United States Patent Office 3,508,481
Patented Apr. 28, 1970

3,508,481
STUDIO LAMP WITH BUILT-IN CAMERA
Maxey A. Hankins, Encino, Calif., assignor to Mole-Richardson Co., Hollywood, Calif., a corporation of California
Filed Sept. 1, 1967, Ser. No. 665,003
Int. Cl. G03b 15/06
U.S. Cl. 95—82          5 Claims

ABSTRACT OF THE DISCLOSURE

A photographic apparatus combining a reflector type studio lamp and a camera mount. The lamp has an arcute vertically symmetrical reflector with separate elongated light sources along the upper and lower edges. These light sources are arranged to reflect beams of light off the reflector generally along its axis of symmetry. The reflector has a central aperture. The camera mount is at the rear of the reflector and arranged to mount a camera with its lens directed through the aperture along the axis of symmetry of the reflector.

BACKGROUND OF THE INVENTION

A soft light designed to cast minimum shadows, especially in the background behind the principal subject to be photographed, is derived by the use of a relatively large reflector, having a roughened surface, suitably coated, as for example, with white paint or equivalent. The light source is housed at a margin or margins of the reflector, illuminating the latter, from which the indirect beams are diffused and projected upon the foreground subject and any background to be photographed. Such a light has particular application in professional still camera work.

Heretofore, the camera has been placed on its own tripod, or otherwise held at the desired location for making the photograph, and the soft light has been placed laterally of the camera. The axis of the soft light pattern or beam therefore necessarily lies at an angle to the axis of the camera lens. Consequently, if the foreground subject is smaller than the background in area, the foreground subject will oftentimes cast shadows which will be picked up in the photograph. Moreover, the independent use of the soft light and the camera requires separate adjustments, necessitating either the employment of two operators, one on the lamp and one on the camera, or the alternate attention of a single operator.

SUMMARY OF THE INVENTION

The present invention embodies a unification of lamp and camera accommodation wherein the camera is retained in adjustable fixed relation to the lamp so that directional positioning of lamp and camera is accomplished simultaneously. The apparatus is thus conveniently controllable by a single operator. However, of greater importance is the fact that the axis of the lens will be disposed generally coincident with the axis of the light beam or pattern. Thus, if any shadows are cast on the background by the foreground subject, the shadows will be directly behind the foreground subject, hence, being masked out by the latter and not appearing in the photograph.

The camera accommodation or support includes a structural framework incorporated in the reflector of the lamp. A camera mount in the general nature of a tripod head with features of adjustability, is mounted on and extends rearwardly from the framework.

The lamp reflector has a vertical concave configuration. Associated with the framework is a window structure in the general nature of a box, open at the rear, the forward wall of which defines a vertical cord across the concave back of the reflector. Such forward wall of the box is formed with an opening which itself may constitute the aperture through which exposure may be made, or plates may be inserted with apertures of lesser size than the major opening. Said forward wall, and the side walls of the box are light impervious, except for the aperture, serving to shield the camera lens from any light emanating from the lamp when the camera is properly positioned on the mount.

The lamp and camera mount combination is supported on any suitable dolly or pedestal for universal positioning by a conventional pan axis swivel for transverse rotation, and trunnions provide a tilt axis for vertical rotation. Thus, the operator may view the image on the ground glass or finder of the camera, and by shifting the combined lamp and camera mount, may suitably position the apparatus and observe the subject matter as well as the level and character of the illumination of the image as seen by the camera.

The position of the trunnions with respect to the sides of the lamp housing is adjustable so that the housing may be properly balanced about the trunnions regardless of the distribution of weight on the housing which is dependent upon, besides other factors, the weight and position of the camera on the camera mount.

Incandescent lights and strobe lights are located at the lower and upper margins, respectively of the lamp reflector which has a symmetrical concave configuration. The optics for the incandescent and strobe lights are essentially identical. Consequently, the light distribution characteristics of the beam reflected from the concave reflection from the strobe lights when photographing a subject are virtually the same as the light distribution characteristics resulting from the incandescent lights used for modeling the subject.

Exposure may be related to the level of illumination provided by the constant incandenscent lights, or the latter may be employed simply for modeling, and exposure made with shutter actuation of the strobe lights.

BRIEF DESCRIPTION OF THE DRAWINGS

FIGURE 1 is a side elevation, partly in section, of the lamp and camera accommodation.

FIGURE 1a is an enlarged vertical section on line 1a—1a of FIGURE 1;

FIGURE 1b is an enlarged vertical section on line 1b—1b of FIGURE 1;

FIGURE 2 is a rear elevation of the lamp and camera accommodation, as viewed on line 2—2 of FIGURE 1;

FIGURE 3 is a front elevation of the lamp and camera accommodation, with portions broken away to show the incandenscent lamps and strobe lights, and illustrating auxiliary reflector wings in phantom, and a power supply and connections for the strobe lights;

FIGURE 3a is a vertical section on line 3a—3a of FIGURE 3;

FIGURE 4 is a perspective view of an optional light diffusing screen for the front face of the lamp and camera accommodation;

FIGURE 5 is a perspective view of an aperture plate;

FIGURE 6 is a perspective view of a closure plate (for use when the camera is not employed on the camera mount);

FIGURE 9 is an enlarged rear elevation of the camera mount, as viewed on line 9—9 of FIGURE 8, with the camera shown fragmentarily in phantom;

FIGURE 10 is a vertical section taken on line 10—10 of FIGURE 7;

FIGURE 11 is an exploded perspective view of a socket and plug coupling utilized in securing the camera mount to the framework of the reflector housing;

DESCRIPTION OF THE PREFERRED EMBODIMENT

Figure 7:
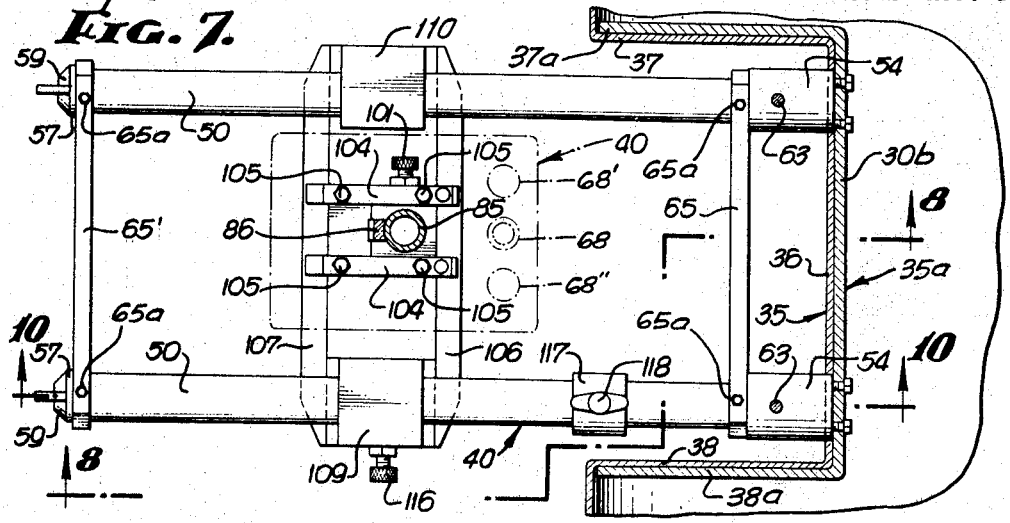
FIGURE 7 is a top plan view of the camera accommodation as viewed on line 7—7 of FIGURE 1, with a fragment of the reflector and window structure shown in section.

A soft light type of lamp generally designated 20, comprises a reeflctor housing or structure 21, symmetrically concave in the vertical, and with straight vertical side walls 22. The reflector is preferably relatively large as contrasted to a spot lamp or lens type lamp, in order to produce a blending and hence minimization of shadow effects.

The inner surface 21' of the reflector structure is suitably provided with a light diffusing surface, as for example, a roughened surface coated with white paint, as contrasted to a smooth, mirror-like surface. This is by way of illustration and not limitation.

Lamp housings 23 and 24 extend across the lower and upper margins, respectively, of the reflector structure. Elongated incandescent lamps 23a are positioned end-to-end as shown in FIGURE 3 to provide a line source of incandescent light which normally is used only for modeling a subject being photographed. Switches 23b are associated with each of the lamps for separate actuation of one or more of the lamps. An elongated reflector 23c, of generally parabolic cross-section is mounted in housing 23 and directs light from lamps 23a against the reflector surface 21'.

Elongated strobe lights 24a are positioned end-to-end as seen in FIGURE 3 to provide a line source of high intensity light, at the instant that a photograph is being taken. An elongated reflector 24b of generally parabolic cross-section is mounted in housing 24 for directing high intensity light from the lamps 24a to the reflector surface 21'.

As best seen in FIGURE 3a, the reflectors 23c and 24b are shaped and arranged so that the light reflected by each such reflector impinges upon the concave surface 21' of reflector 21 in the same fashion. In other words, the optics of the light systems in housings 23 and 24 are substantially identical. Since the reflector 21 has a vertically symmetrical configuration, the light distribution characteristics of light reflected from the surface 21' resulting from the strobe lights 24a is generally similar to the light distribution characteristics of light reflected from such surface resulting from the incandescent lamps 23a. As a consequence, light of generally the same distribution impinges upon the subject being photographed when the strobe lights are actuated as when the incandescent lamps 23a are used for initially modeling the subject.

A conventional power supply generally designated 24' in FIGURE 3 is connected to the strobe lights 24a and also by a lead 24' to the camera associated with the apparatus, so that the strobe lights will be energized upon actuation of the camera shutter in a manner well known in the art.

Auxiliary reflector wings 25' may be pivotally mounted to the two sides proximate the front of the housing 21 as seen in FIGURE 3.

The reflector housing 21 is mounted on a dolly or pedestal 26, through the use of a pan axis swivel 27 and a yoke 28. Rings 26' are welded to the upper ends of the yoke 28. Trunnions, generally designated 29, rotate in the rings 26' providing a tilt axis for the housing 21. Horizontally extending vertical plates 27' are attached to the side walls 22 of the housing, and are spaced therefrom by flanges formed along the top and bottom of the plates.

Rectangular plates 28a and generally circular plates 28b slidably engage opposite sides of the plates 27'. The latter plates 27' have horizontal elongated slots 29'. Internally threaded inserts 30 are welded into the plates 28a and pass through the slots 29' and the plates 28b. The trunnions 29 include threaded shafts 31 which are engaged in the inserts 30 and pass through clearance holes 32 in the rings 26'. The trunnions further include annular shoulders 32a which bear against thrust bearings 32b mounted in recesses 32c in the outer surface of rings 26'. Internally threaded inserts 33 are also welded to plates 28a and pass through the slots 29' in plates 27' and through extension 28c on circular plates 28b. Bolts 34 are threaded into inserts 33, with clamp washers 34' engaged between the bolt heads and extensions 28c. Preferably, lock washers 34" are interposed between the bolt heads and extensions 28c.

By loosening the trunnions 29, the housing 21 may be pivoted vertically to any desired angular position about the trunnions. By loosening both the trunnions 29 and bolts 34, the tilt axis of the housing may be shifted horizontally with respect to the trunnions due to the slidable engagement between the trunnions and the slots 29' in plates 27'. Consequently, by the aforementioned arrangement the housing 21 may be balanced about the trunnions regardless of the weight or position of a camera mounted on the housing. Once the housing is suitably balanced, the trunnions 29 and bolts 34 are tightened.

The reflector housing 21 includes a window structure 35, which is in the form of an open box having a forward vertical wall 36 and vertical side walls 37 and 38, all of which are impervious to light except for the provision of an opening 39 in the forward wall. The forward wall 36 of the window structure 35 generally defines a vertical cord across the concave surface of the reflector housing, and is disposed centrally thereof, as is best seen in FIGURES 1, 2 and 3.

A frame member 35a is bolted or welded to the window structure 35 below the opening 39 to reinforce the same, and provides support for a camera mount, generally designated 40. The frame member includes a forward wall 36a and vertical side walls 37a and 38a.

Figure 8:
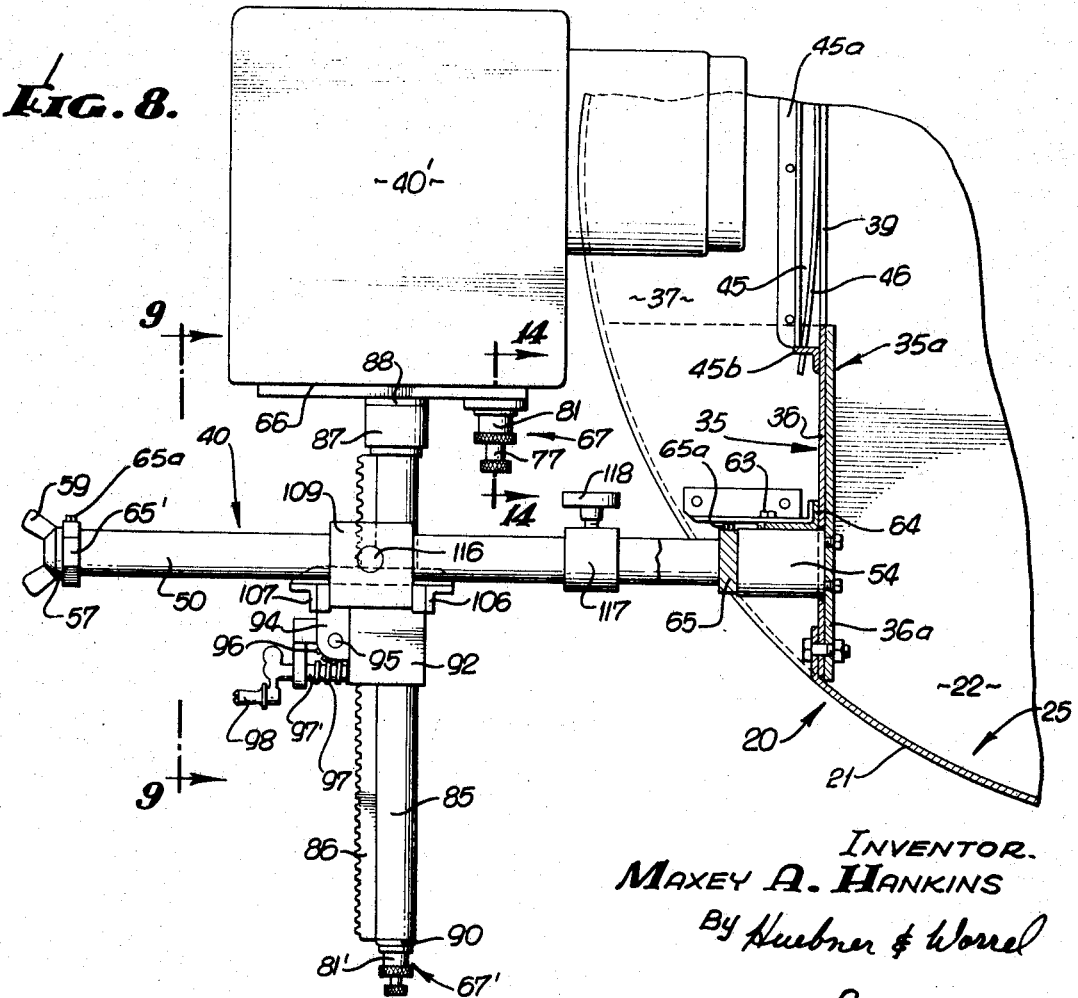
FIGURE 8 is a partial vertical section on line 8—8 of FIGURE 7, with the camera shown in position.

The opening 39 may itself constitute an aperture through which exposure may be made by the camera 40', or the aperture may be reduced by utilizing a solid plate 41 having an aperture 42 lesser in area than the opening 39, as seen in FIGURE 5. Alternatively, a complete solid plate 41', as seen in FIGURE 6 could be used when the camera is not in use and the apparatus is employed only as a source of soft light. These plates may be inserted in slide grooves 45 defined by vertical brackets 45a only one being shown in FIGURE 8, secured to side walls 37 and 38. The plates are supported by a horizontal bracket 45b secured to front wall 36 below the aperture 39. Leaf springs 46 disposed in the grooves urge the plates forward in the grooves.

If desired, a silk screen 45' may be positioned over the front of housing 21 by engagement in slide grooves 46' on the sides of the housing for the purpose of further diffusing the light emanating from the reflector surface. A cut-out portion 47 is provided in the screen 45' to provide an unobstructed path between the camera and the subject being photographed.

The camera mount 40 comprises a pair of rigid tubes 50 which are horizontally secured upon the framework 35a. This is accomplished, as to each tube, by utilizing a frusto-conical insert 51, having a cylindrical shank 52 which fits snugly into the forward end of the tube. The frusto-conical head seats in a socket 53 of complementary design, provided by a mounting lug 54 which is bolted or otherwise secured to the framework 35a.

The lug has a threaded bore 55. At the opposite end of the tube 50 is a plug 56, with a shoulder 57 which bears against the end of the tube. Extending through the plug is an elongated bolt 58 having a wing head 59 at one end. The shank of the bolt is threaded at the other end for engagement in the threaded bore 55 of the lug 54. The forward end 60 of the tube seats against an annular shoulder 61 of the insert 51. Tightening of the bolt 58 results in rigid securement of the tube 50 to the framework 35a. A pin 62 passing through the shank of bolt 58 retains the bolt in the tube 50 when the latter is disengaged from the securement with the framework 35a. A screw 63 may be employed through an angle brace 64 to give further stability to the lug 54. Also, it is desirable to utilize rigid crosspieces 65 and 65' between the tubes 50 at their forward and rear ends to aid in maintaining the tubes parallel. The crosspieces 65 and 65' are firmly attached to the tubes 50 by screws 65a passing through the crosspieces 65 and 65' and the tube 50 and engaging threaded bores 65b in the shank 52 of insert 51 and plug 56, respectively. Hence, rigid rectangular support is achieved by the tubes 50, the crosspieces 65 and 65', and the frame 35a, with its attachments to the tubes.

Figure 14:
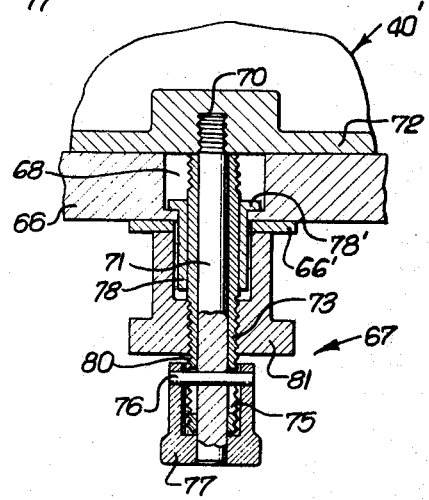
FIGURE 14 is an enlarged fragmentary vertical section taken on line 14—14 of FIGURE 8, showing the camera clamping screw attachment of the camera base, the latter having a relatively small diameter threaded socket.
Figure 15:
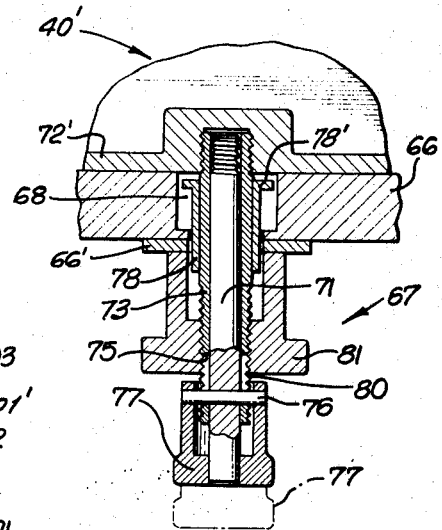
FIGURE 15 is a view similar to FIGURE 14, wherein a relatively large threaded camera socket is engaged.

The camera mount includes a platen 66 on which the camera 40' is clamped by a screw assembly 67 or 67'. Details of assembly 67 are shown in FIGURES 14 and 15. Some cameras are manufactured with a threaded socket 70 having a 1/4"-20 screw thread; others utilize a 3/8"-16 thread. The screw assembly 67 is adaptable to either, and of course may be altered to any other diameter and thread utilized in cameras. The smaller diameter screw 71 is threaded into camera base 72 in FIGURE 14, and the larger diameter screw 73 is threaded into camera base 72' in FIGURE 15. The screw assembly 67 may be mounted in any one of three countersunk bores 68, 68' or 68" in the forward end of the platen, as seen in FIGURE 7, to accommodate cameras having threaded sockets located in positions corresponding to the positions of such bores. The carema 40' is for illustrative purposes only, as various cameras are fully adaptable to the invention.

Screw 73 is hollow and slidably receives screw 71. Screw 73 also is formed with a slot 75 to accommodate a pin 76 which extends through the shank of screw 71 and retained in a head 77. Rotation of the head 77 turns both screws simultaneously. A collar 78 having an annular flange 78' at its upper end is fixed to the screw 73 by brazing or welding. The flange seats in the bottom of the countersunk bore 68 and serves to maintain the assembly 67 attached to the platen 66 when no camera is mounted thereon. The screw 73 is provided with threads 80 at its lower end region, which are engaged by a lock nut 81.

If the screw 71 is to be used, the lock nut 81 is backed off a relatively short distance on the screw 73 and the head 77 is pushed upward so that the pin 76 at the upper end of the slot 75. This projects the screw 71 beyond the upper end of the hollow screw 73, and rotating the head 77 will cause the screw 71 to thread into the camera base 72. The lock nut 81 is then tightened to clamp the camera base to the platen. A washer 66' is optionally interposed between the platen and the lock nut 81.

To thread the screw 73 into camera base 72', the lock nut is backed off a sufficiently long distance so that when the head is dropped down, the pin 76 is at the lower end of slot 75, which withdraws screw 71 into the screw 73. Pushing the head 77 up and rotating the same starts the upper treads of screw 73 into the camera base 72'. The lock nut is then tightened to clamp the camera base to the platen.

The platen 66 may be adjusted vertically as well as transversely, and forward and backward, in order to correctly position the lens of the particular camera in use. The mechanism for these purposes will be next described.

A vertical hollow post 85 is provided with a rack 86. A plug 90 is inserted at the lower end of the post. Seated in the upper end of the post is a shouldered hollow block 87. Screws 85' in countersunk holes 86' in the rack 86 pass through the post 85 and thread into the block 87 and plug 90 to secure the rack, block and plug to the post 86. The platen 66 rests on the block 87, and machine screws 89 unite the platen and block. If desired, the platen may be reversed on the block 87 so that the bores 68, 68' and 68" for screw assembly 67 are suitably located for certain camera installations.

An alternate camera clamping screw assembly 67' is disposed in the post 85. It is substantially identical to the screw assembly 67, except that the screw elements corresponding to the screws 71 and 73 are substantially longer, and the lock nut 81' bears against the bottom of the plug 90 of the post through washer 66" rather than directly against the platen 66 through washer 66'.

The post 85 is slidably mounted in a cylindrical vertical bore 91 in a rectangular block 92. Two arms 93 and 94 extend from the rear side of the block 92. A shaft 95 is rotatably mounted in suitable bores in the arms. A worm gear 96 is fixed to the shaft 95 and is engaged by a worm 97. The shaft 97' for the worm is journaled in bores 97a and 97b in the block 92. A crank 98 outside of the block is fixed to the end of the worm shaft 97'. A pinion gear 99 is fixed to the shaft 95 and is arranged so that its teeth engage the teeth on the rack 86 which extends trough a vertical passage 100 in the block. As is apparent, rotation of the crank 98 causes upward or downward movement of the rack 86 and post 85, depending upon the direction of rotation of the crank.

A set screw 101 having a nylon swivel 101' is threaded through a threaded insert 102 engaged into a threaded bore 103 communicating with the bore 91. The screw 101 permits the post 85 to be locked into position with respect to the block 92.

Figure 12:
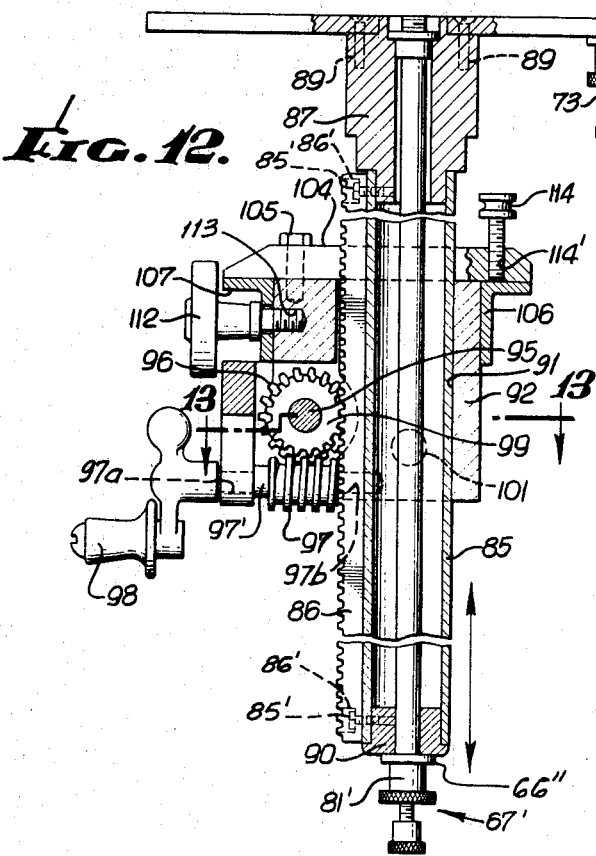
FIGURE 12 is a vertical section taken on line 12—12 of FIGURE 9.

Bars 104 are fixed to the upper surface of the block 92 by means of screws 105. As best seen in FIGURE 12, the bars 104 extend beyond the edges of the block 92, and rest upon the upper surface of two transversely extending bracket arms 106 and 107 which are fastened by means of screws 108 to guide members 109 and 110. The arms 106 and 107 provide a channel in which the block 92 may be slid in a transverse direction with respect to the window structure 39, as shown by arrows A in FIGURE 9.

An elongated slot 111 is cut into the rear arm 107. A set screw 112 extends through the slot and is threaded into a bore 113 in the front face of the block 92. The set screw 112 provides means for fixing the position of the block 92 with respect to the bracket arms 106 and 107. An additional pair of set screws 114 threaded into openings 114 in the bars 104 and arranged to contact the front bracket arm 106 also serve to secure the block 92 in position with respect to the bracket arms 106 and 107.

The guide member 109 is in the form of a block having a bore 115 therethrough in which the right hand tube 50 of the camera mount (as seen from the rear) is slidably mounted. The other guide member 110 is in the form of a channel which engages the other tube 50 in sliding relationship. Consequently, the block 92 mounted on the bracket arms 106 and 107 which are in turn connected to the slideable guide members 109 and 110 may be moved toward and away from the window structure 35, thereby permitting the spacing between the camera 40' mounted on the platen 66 and the window structure 35 to be varied.

Figure 13:
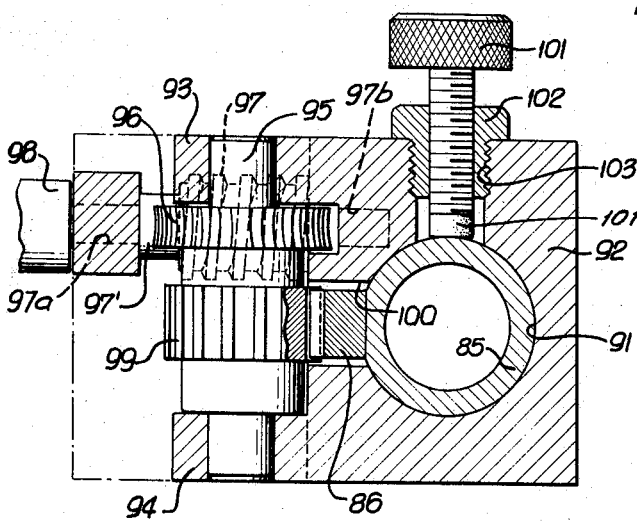
FIGURE 13 is an enlarged horizontal section taken on the line 13—13 of FIGURE 12.

A set screw 116 engaged in threaded insert 116' in the wall of the guide member 109 is arranged to engage the surface of the right hand tube 50 so that the bracket arms 106 and 107 and the block 92 connected thereto may be locked in any desired position along the tubes. The screw 116 and insert 116′ are identical to the screw 101 and insert 102 in FIGURE 13.

A sleeve 117 surrounding the tube 50 which carries the guide member 109 carries a screw 118. The end of the screw 118 bears against an aluminum shoe 119 in a recess 120 in the sleeve.

When the set screw 118 is tightened against the shoe 119 locking the sleeve 117 in fixed position on the tube 50, the sleeve forms a stop for the cross arm 106, and therefore the platen 66 carried therby. Hence, after an operator has focused his camera on the subject being photographed, and locked the sleeve 117 adjacent to the cross arm 106, the camera may be moved rearwardly for suitable adjustments and then slid forwardly into its original position.

In using the apparatus described herein, which is the most convenient manner of practicing the method of photography involved, the camera 40′ is mounted on the platen 66 by means of either of the screw assemblies 67 and 67′. The housing 21 of the lamp is then balanced by loosening trunnions 29 and bolts 34 and suitably locating the trunnions in slots 29′.

By vertically adjusting the platen 66 with respect to the block 92 by use of the crank 98 and by appropriately horizontally locating the platen by shifting the block 92 transversely along the bracket arms 106 and 107 and the bracket arms on the tubes 50 toward or away from the aperture 39 in the window structure 35, the lens of the camera is located so that its axis is generally coincident with the axis of the light beam of the lamp 20, and a sufficient distance behind the window structure 35 so as to be outside the path of any light emanating from the lamp 20.

With the camera in place the photographer may observe the level and character of the illumination of the subject as it will be actually seen by the camera by viewing the image on the ground glass or finder of the camera and may correct the level of illumination by turning on or off one or more of the switches 23b associated with the incandescent lamps 23a. The shutter of the camera is then actuated. The exposure may be made by use only of the incandescent lighting, or by causing a high intensity light to be cast by the strobe lights in the lamp simultaneously with the exposure of the film in the camera. If photographing in color, normally only the strobe lights are used for the film exposure. The strobe lights may, if desired, be adjustable for varying their intensity. The screen 45′ and reflector wings 25′ may also be employed to control illumination of the subject.

The basic concept of the method, namely photographing from the rear of a diffused soft light and generally on the axis of the light beam, could be practiced, although less conveniently, by providing an aperture in the reflector, and independently supporting the camera in position to exposure through the aperture.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures, devices and methods.

What is claimed is:

1. Photographic apparatus comprising a lamp housing having generally flat, parallel, vertical sides and a concave reflector extending transversely between said sides, said reflector having a forwardly facing reflecting surface of generally arcuate, vertically symmetrical configuration terminating at generally horizontal, parallel upper and lower edges, first and second elongated light sources respectively disposed adjacent and substantially parallel to said upper and lower edges of said reflecting surface, said first and second light sources being substantially vertically symmetrically located relative to said reflecting surface and directed so that beams of light reflected by said reflecting surface from said first and second light sources are both directed generally along the axis of symmetry of said reflector, an aperture substantially centrally located in said reflector, camera mounting means at the rear of the reflector and connected to said lamp housing, said camera mounting means being arranged to mount a camera in position with its lens disposed adjacent to said aperture and generally aligned with the axis of symmetry of said reflector.

2. Photographic apparatus as defined in claim 1, wherein one of said light sources is a source of incandescent light and the other said light source is a camera shutter actuated electronic flash light.

3. Photographic apparatus as defined in claim 1, wherein said aperture is defined by opaque window structure centrally located within said reflector and projecting forwardly from the rearwardmost, central portion of said reflecting surface of the reflector so as to shield the camera lens from said first and second light sources.

4. Photographic apparatus as defined in claim 3, wherein said window structure comprises a pair of spaced, vertical side walls substantially parallel to said sides of the lamp housing and connecting at their forward edges with a forward vertical wall defining a vertical chord across the concave-reflecting surface, said aperture being located in said forward wall.

5. Apparatus as defined in claim 4, including means providing slide grooves in said forward wall adjacent to said aperture, and a masking plate removably slidably mounted in said grooves, said masking plate having an opening therethrough that is smaller than said aperture.

References Cited

UNITED STATES PATENTS

| 1,799,866 | 4/1931 | Roth | 95—82 |
| 2,138,723 | 11/1938 | Bell | 95—86 |
| 2,750,489 | 6/1956 | Gibson | 95—86 XR |
| 2,760,048 | 8/1956 | Schulte | 240—1.3 |
| 3,064,547 | 11/1962 | Humphries | 95—86 |
| 3,204,089 | 8/1965 | Schmidt | 240—1.3 |

NORTON ANSHER, Primary Examiner

L. H. McCORMICK, Jr., Assistant Examiner

U.S. Cl. X.R.

95—86; 240—1.3